United States Patent [19]
Lo Presti et al.

[11] Patent Number: 5,413,823
[45] Date of Patent: May 9, 1995

[54] COLLAPSIBLE AND EXPANDABLE ROLL RISER

[75] Inventors: Philip B. Lo Presti, Chicago; Michael J. Rancich, Mundelein, both of Ill.

[73] Assignee: Shippers Paper Products Company, Glenview, Ill.

[21] Appl. No.: 190,553

[22] Filed: Feb. 2, 1994

[51] Int. Cl.[6] ............................ B32B 3/04; B32B 3/06
[52] U.S. Cl. ........................................ 428/12; 428/40;
428/116; 428/182; 410/121; 410/154; 206/814
[58] Field of Search .................. 428/40, 12, 116, 182;
410/121, 154; 108/51.3; 206/593, 814

[56] References Cited

U.S. PATENT DOCUMENTS

| | | | |
|---|---|---|---|
| 3,079,876 | 3/1963 | Doane | 108/56 |
| 3,079,877 | 3/1963 | Doane | 108/56 |
| 4,247,237 | 1/1981 | Brown | 410/154 |
| 4,494,897 | 1/1985 | Rogers | 410/154 |
| 4,585,381 | 4/1986 | Boyse | 410/154 |
| 4,865,889 | 9/1989 | Boyse | 428/12 |

FOREIGN PATENT DOCUMENTS

| | | | |
|---|---|---|---|
| 878255 | 8/1991 | Canada | 105/182 |

OTHER PUBLICATIONS

Brochure "Capabilities of Products" by Shippers Paper Products Co. Dec. 1988.

*Primary Examiner*—Alexander S. Thomas
*Attorney, Agent, or Firm*—Schwartz & Weinrieb

[57] ABSTRACT

A roll riser for use such as in staggering paper rolls during shipment generally includes first and second deck sheets each having inner and outer sides, a fold line along the edge of the core and a fold line along its midpoint, and are connected together by an open-celled core. The roll riser is collapsible along the fold lines for shipment to the user or for storage so as to occupy a relatively small amount of space and then expanded by the user for use. In a first embodiment, pressure sensitive tape is secured to the inner sides of the sheets and when the roll riser is in an expanded configuration, the tape adheres to the core. In a second embodiment, pressure sensitive tape is secured to the outer side of the first sheet and when the roll riser is in an expanded configuration, the tape is adhered to the outer sides of the first and second sheets. In each embodiment, the tape causes the roll riser to remain in the expanded configuration so as to prevent the roll riser from collapsing.

23 Claims, 2 Drawing Sheets

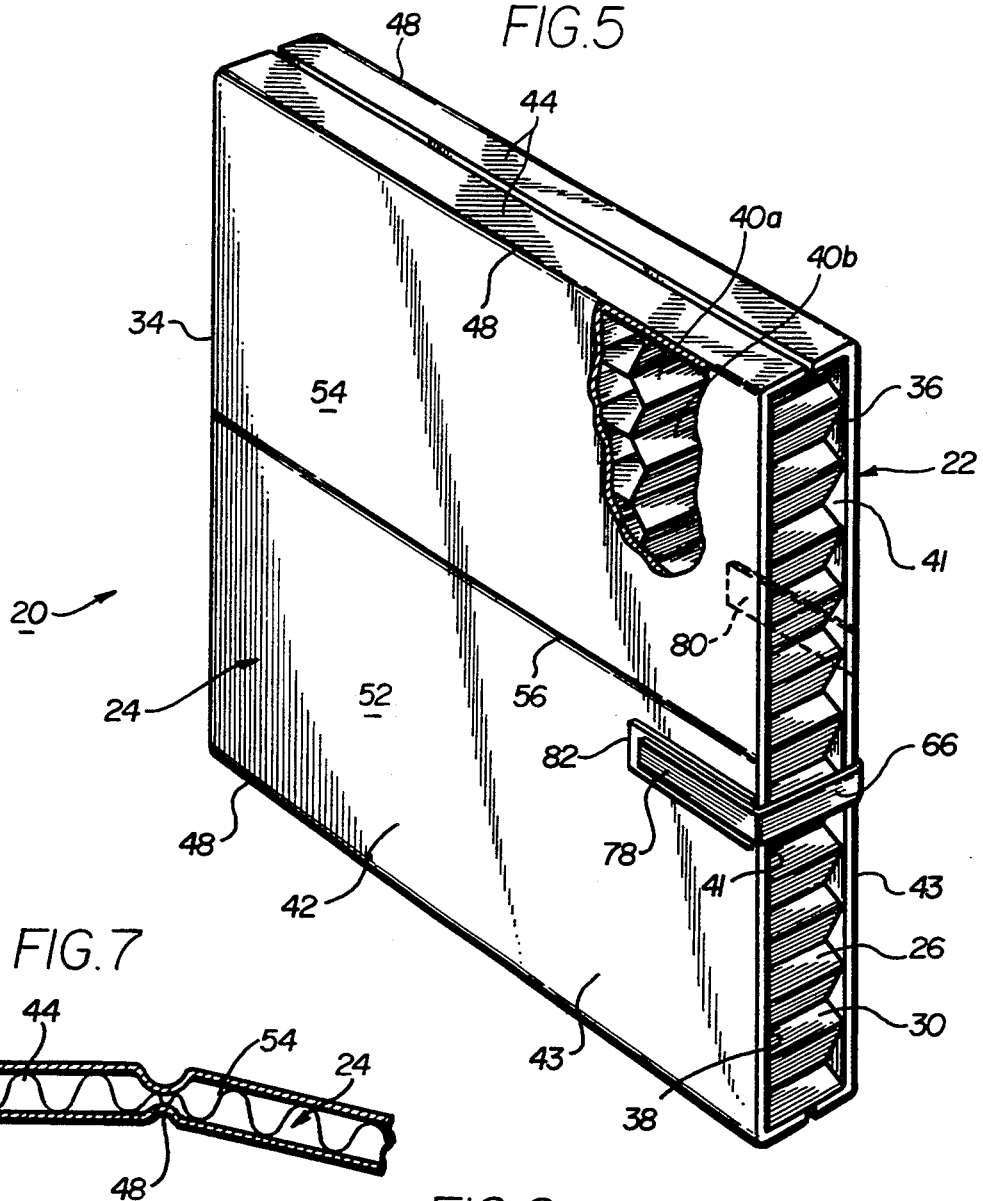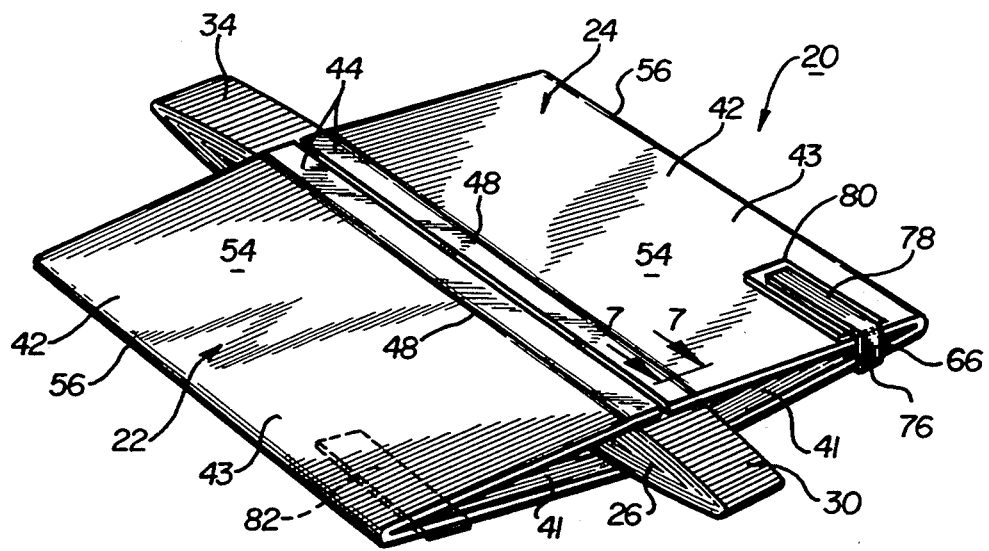

COLLAPSIBLE AND EXPANDABLE ROLL RISER

FIELD OF THE INVENTION

This invention is generally directed to a device generally referred to as a roll riser or void filler to stagger paper rolls during shipment. More particularly, the invention contemplates an open-cell roll riser which can collapse for shipment to the user or for storage while occupying a relatively small amount of space and then expanded by the user for use.

BACKGROUND OF THE INVENTION

The use of roll risers is well-known in the art. For example, U.S. Pat. No. 4,865,889 to Boyse discloses an open-celled roll riser that is comprised of a honeycomb core surrounded by deck sheets. The ends of the deck sheets are secured to the ends of the honeycomb core and include integrally formed score indentations in the deck sheet along the edges of the core and along the midpoint of the deck sheets. The roll riser collapses around the fold lines and the honeycomb core collapses therewithin. The roll riser may be moved from a collapsed configuration to an expanded configuration by pulling the opposing ends of the deck sheets which are secured to the core away from each other until the sides of the deck sheets generally abut the core.

While this type of device or roll riser has worked effectively in prior applications, it tends to collapse due to the natural tendencies of the honeycomb core to collapse and of the score indentations which tend to urge the deck sheets of the roll riser outwardly. The present invention is intended to present further improvements to the prior art roll riser disclosed in U.S. Pat. No. 4,865,889 so as to prevent the roll riser from collapsing during use.

OBJECTS OF THE INVENTION

A general object of the present invention is to provide a novel roll riser device which is used to stagger paper rolls during shipment.

Another object of the present invention is to provide a novel roll riser which has an open-cell core which can collapse for shipment to the user or for storage while occupying a relatively small amount of space and then be expanded by a user for use.

An object of the present invention is to provide a novel roll riser which will remain in an expanded configuration when it is being used to stagger paper rolls during shipment.

A specific object of the present invention is to provide a novel, collapsible roll riser having means for alternatively retaining the structure in a collapsed condition or in an expanded condition.

A further object of the present invention to provide a novel roll riser that is lightweight, rigid and strong.

A specific object of the present invention is to provide a novel roll riser which can be assembled with ease by a user with no specialized training.

SUMMARY OF THE INVENTION

Briefly, and in accordance with the foregoing, the present invention discloses a roll riser for use in staggering paper rolls during shipment. The roll riser generally includes first and second deck sheets each having inner and outer sides, a fold line along the edge of the core and a fold line along its midpoint, and are connected together by an open-celled core. The roll riser is collapsible along the fold lines for shipment to the user or for storage so as to occupy a relatively small amount of space and then expanded by the user for use. In a first embodiment, pressure sensitive tape is secured the inner sides of the sheets and when the roll riser is in an expanded configuration, the tape adheres to the core. In a second embodiment, pressure sensitive tape is secured to the outer side of the first sheet and when the roll riser is in an expanded configuration, the tape is adhered to the outer sides of the first and second sheets. In each embodiment, the tape causes the roll riser to remain in the expanded configuration so as to prevent the roll riser from collapsing.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements throughout the several views, and in which:

FIG. 5 is a perspective view of a device or roll riser, partially cut away to reveal an open-celled core, in an expanded configuration, which incorporates the features of a second embodiment of the invention;

FIG. 6 is a perspective view of the roll riser of FIG. 5 shown in a collapsed configuration; and FIG. 7 is a cross-sectional view of a score line of the roll risers of FIGS. 2 and 6 along line 7—7.

DETAILED DESCRIPTION OF THE PREFERRED EMBODIMENT

Figures 1, 2, 3, 4:
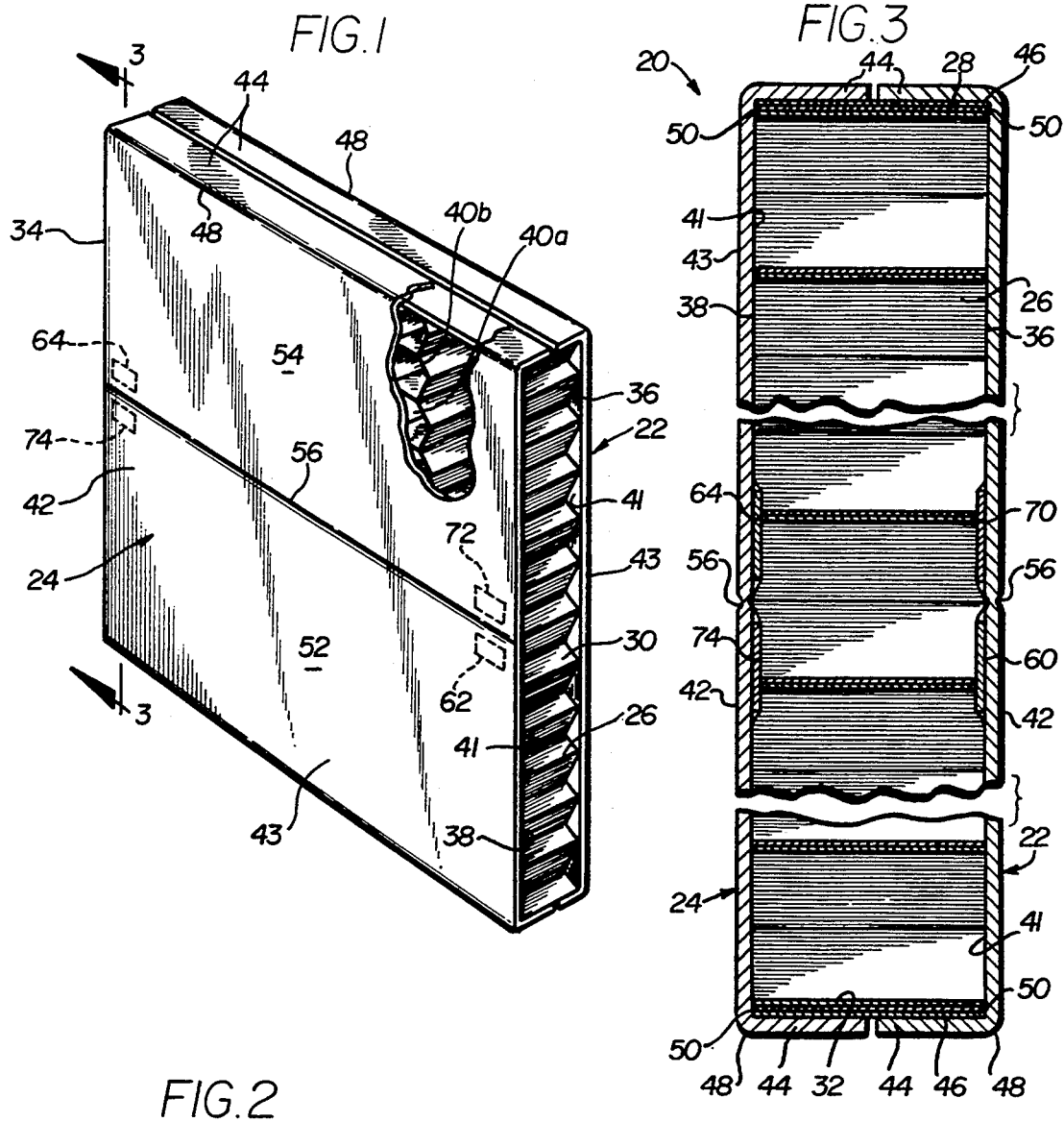
FIG. 1 is a perspective view of a device or roll riser, partially cut away to reveal an open-celled core, in an expanded configuration, which incorporates the features of a first embodiment of the invention.
FIG. 2 is a perspective view of the roll riser of FIG. 1 shown in a collapsed configuration.
FIG. 3 is a cross-sectional view of the roll riser of FIG. 1 along line 3—3.
FIG. 4 is a cross-sectional view of the roll riser of FIG. 2 along line 4—4.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The device or roll riser 20 which incorporates features of the present invention may be used to stagger paper rolls (not shown) during shipment. The roll risers or void fillers 20 of the present invention may be used in a variety of shipping applications, such as within a truck trailer, a ship or an airplane cargo bay. The roll riser 20 is of a lightweight construction and may be of a variety of sizes, depending on the use.

The roll riser 20 of the present invention is a further improvement of the roll riser of U.S. Pat. No. 4,865,889 to Boyse, whose disclosure is herein incorporated by reference. The roll riser 20 can be collapsed for shipment to the user or for storage and occupies a relatively small amount of space, and then expanded by the user for use in staggering paper rolls during shipment. Due to a novel feature of the roll riser 20 of the present invention, which is not provided in U.S. Pat. No.

4,865,889 to Boyse, the roll riser 20 maintains either a collapsed configuration or an expanded configuration, as described in detail hereinbelow.

The roll riser 20 is of a sandwich-type construction so as to increase the strength of the roll riser 20 when it is in an expanded configuration. The sandwich-type construction helps to prevent the roll riser 20 from collapsing under the load of the paper rolls during shipping and is formed by a first, generally rigid, deck sheet 22 and a second, generally rigid, deck sheet 24 attached together by a reinforcing and strengthening core 26.

The core 26 is preferably of an open-celled configuration having ends 28, 30, 32, 34 and sides 36, 38. The core 26 is made of suitable materials, preferably heavy paper. This type of construction is well known in the art, and, as such, will not be described in detail herein.

Briefly, the core 26 can be made by stacking a series of core sheets, for example 40a and 40b, which are generally hexagonally-shaped, and gluing the hexagonally-shaped core sheets 40a, 40b to one another at appropriate points to create an open-celled, "honeycomb-like" core structure when the roll riser 20 is in an expanded configuration. When the roll riser 20 is in its collapsed reduced volume configuration, as shown in FIGS. 2 and 6, the core 26 is generally flat. Thus, the roll riser 20 does not occupy a large amount of space when it is being shipped to a user or stored. Furthermore, since the roll riser 20 is generally flat, multiple roll risers may be stacked on top of each other for shipment to the user or for storage. When the roll riser 20 is expanded to its increased volume configuration, as shown in FIGS. 1 and 5, the honeycomb core 26 is expanded to its open-celled configuration. It is to be understood that it is within the scope of the present invention that the core 26 may be of any form, so long as the core 26 is expandable and collapsible.

The deck sheets 22, 24 are of substantially equal size and similar construction and are made of suitable rigid materials, such as corrugated cardboard. Each deck sheet 22, 24 has side portions 42, each having a inner side 41 and an outer side 43, and end portions 44 which are secured to the ends 28, 32 of the core 26 by suitable means, such as a layer of adhesive 46. When the roll riser 20 is expanded the inner sides 41 of each side portion 42 generally abut the sides 36, 38 of the core 26. The end portions 44 are formed by folding each deck sheet 22, 24 along a fold line 48 generally around an adjacent edge 50 of the core 26. Thus, the deck sheets 22, 24 completely enclose the core 26 therewithin. The fold lines 48 are preferably formed by a scoring bead or an integrally formed score indentation, as shown in FIG. 7, which extends along the length of each deck sheet 22, 24. The score indentations are formed by any well-known method, such as an automatic roller or a manual device, and are intended not to pierce, cut, or otherwise weaken the material. Each side portion 42 is divided at approximately its midpoint into two generally equal portions 52, 54 by a fold line 56 which is preferably formed by a scoring bead or an integrally formed score indentation, as described hereinabove, which extends along the length of each deck sheet 22, 24.

The fold lines or score indentations 48, 56, allow the deck sheets 22, 24 to be easily folded outwardly by a user to collapse the roll riser 20 for shipment to a user or for storage. However, even without action by the user, the natural tendencies of the fold lines 48, 56 urge the side portions 42 of the deck sheets 22, 24 to move outwardly. Thus, the score indentations 48, 56, in combination with the natural tendency of the honeycomb core 26 to collapse, act to urge the roll riser 20 into a collapsed configuration.

In order to remedy the roll riser's 20 natural tendency to collapse, the present invention discloses novel solutions. In a first embodiment which incorporates the features of the present invention, as shown in FIGS. 1-4, pieces of pressure sensitive tape, for example 58, 60, 62, 64, are placed on the inner sides 41 of the deck sheets 22, 24 and adhere to the core 26 when the roll riser 20 is expanded as described hereinbelow. In a second embodiment which incorporates the features of the present invention, as shown in FIGS. 5 and 6, a strip of pressure sensitive tape 66 is secured to the outer sides 43 of the deck sheets 22, 24, as described hereinbelow.

As shown in FIGS. 1-4, the roll riser 20 includes pieces of pressure sensitive tape 58, 60, 62, 64 which are secured to the inner sides 41 of the deck sheets 22, 24 at positions generally adjacent to the fold lines 56 and near the ends of the deck sheets 22, 24. One or more pieces or strips of tape can be used on each side portion 42, 44 of the roll riser 20. For example, if four pieces of tape are used, as shown in the drawings, tape pieces 58, 60, 62, 64 are positioned at alternating positions along the sides of the fold line 56. That is, on each side portion 42, 44, one piece of tape 58, 62, respectively, is at a position along one side of the fold line 56 at one end of the deck sheet 22 or 24, and the other piece of tape 60, 64, respectively, is at a position along the opposite side of the fold line 56 at the other end of the deck sheet 22 or 24. Alternatively, if one piece of tape is used on each side portion 42, 44, one piece of tape, for example 58, can be placed at a position along one side of the first deck sheet 22 fold line 56 and the other piece of tape 62 is positioned along the opposite side of the fold line 56 of the second deck sheet 24. When the roll riser 20 is expanded, the pieces of tape 58, 60, 62, 64 adhere to the sides 36, 38 of the core 26 and counteract the outwardly urging forces created by the fold lines 56 and prevent the roll riser 20 from collapsing.

When the device or roll riser 20 is in a collapsed configuration, in order to prevent the pieces of tape 58 and 60, 62 and 64 from sticking to the inner side 41 of the deck sheet 22, 24, respectively, release liners 68, 70, 72, 74 are provided on the opposite side of the fold line 56 at these contact points, as shown in FIG. 4. Release liners 68, 70, 72, 74 are well-known in the art and may be made of a suitable material that allows the tape to stick to it sufficiently to retain the roll riser in the collapsed configuration, and also allows the tape to be released from it when the roll riser is manually manipulated into an expanded configuration. The release liners 68, 70, 72, 74 are secured to the inner side 41 of the deck sheets 22, 24 by suitable means, such as adhesive.

When the roll riser 20 is in its collapsed, generally flat configuration, as shown in FIG. 2, the side portions 42 of each deck sheet 22, 24 are collapsed about their fold lines 56, the core 26 is collapsed and the pieces of tape 58, 60, 62, 64 stick to their respective release liners 68, 70, 72, 74. To expand the roll riser 20, the user pulls the opposing ends 44 of the roll riser 20 away from each other. As the roll riser 20 is expanded, the release liners 68, 70, 72, 74 release the pieces of tape 58, 60, 62, 64, respectively, and the side portions 42 of the deck sheets 22, 24 move inwardly toward the core 26. When the roll riser 20 is fully expanded, the side portions 42 of the deck sheets 22, 24 generally abut the sides 36, 38 of the core 26 and the pieces of tape 58, 60, 62, 64 generally adhere to the sides 36, 38 of the core 26. Since the side portions 42 of the deck sheets 22, 24 are adhered to the core 26, the outwardly urging forces created by the fold lines 56 is counteracted, the core 26 cannot collapse, and the roll riser 20 remains expanded.

In the second embodiment, as shown in FIG. 5, the roll riser 20 includes a strip of tape 66 secured to the outer sides 43 of the deck sheets 22, 24 when expanded, such that the strip of tape 66 overlaps an end 30 of the core 26. As shown in FIG. 6, when the roll riser 20 is collapsed, the strip of tape 66 is secured to the first deck sheet 22, with the first end 76 of the strip of tape 66 secured to or adhered to the outer side 43 of the first deck sheet 22 along one side of the fold line 56 and with the second end 78 of the strip of tape 66 secured to the outer side 43 of the first deck sheet 22 along the other side of the fold line 56. In order to secure the second end 78 of the strip of tape 66 releasably to the outer side 43 of the first deck sheet 22, a release liner 80 of the type described hereinabove is provided at that contact point.

When the roll riser 20 is in its collapsed, generally flat configuration, as shown in FIG. 6, the side portions 42 of the deck sheets 22, 24 are collapsed about their fold lines 56, the core 26 is collapsed and strip of tape 66 is in its first position with the first end 76 of the strip of tape 66 being secured to or adhered to the outer side 43 of the first deck sheet 22 and the second end 78 of the strip of tape 66 being adhered to or secured to the release liner 80. When the roll riser 20 is to be expanded, the second end 78 of the strip of tape 66 is peeled off of the release liner 80, and the roll riser 20 is expanded by pulling the opposing ends 44 of the roll riser 20 away from each other. As the roll riser 20 is expanded, the side portions 42 of the deck sheets 22, 24 move inwardly. When the roll riser 20 is fully expanded, the side portions 42 of the deck sheets 22, 24 generally abut the sides 36, 38 of the core 26 and the strip of tape 66 is moved to its second position where the strip of tape 66 is wrapped over the end 30 of the core 26 and the second end 78 of the piece of tape 66 is secured to the outer side 43 of the second deck sheet 24 as shown in FIG. 5. Since the strip of tape 66 is secured to each deck sheet 22, 24, the outwardly urging forces created by the fold lines 56 is counteracted, the core 36 cannot collapse, and the roll riser 20 remains expanded.

A release liner 82 of the above described type may be provided at the point where the second end 78 of the strip of tape 66 contacts the second deck sheet 24 when the second end 78 is moved to its second position. If a release liner 82 is provided at this contact point, the roll riser 20 may be collapsed again by peeling the second end 78 of the strip of tape 66 away from the release liner 82 and collapsing the roll riser 20 by pushing the opposing ends 44 of the roll riser 20 toward each other. When the roll riser 20 is collapsed, the second end 78 is again secured to the release liner 80 on the first deck sheet 22 as shown in FIG. 6. Thus, the roll riser 20 may be used multiple times. It is also envisioned that a release liner may be provided at the point where the first end 76 contacts the first deck sheet 22 so that the strip of tape 66 can be replaced. It is also envisioned that multiple strips of tape may be used in like arrangements.

In use, the roll riser 20 is placed against a roll of paper (not shown) with the side portions 42 of the deck sheets 22, 24 abutting the paper rolls. The forces created by the load of the paper rolls during transport is resisted by the roll riser 20 so the paper rolls are stabilized during shipment. Shipping loads can be distributed across multiple paper rolls when using roll risers.

The roll riser 20 of the present invention can be assembled and disassembled easily and quickly. Thus, no specialized training is necessary.

While preferred embodiments of the present invention are shown and described, it is envisioned that those skilled in the art may devise various modifications of the present invention without departing from the spirit and scope of the appended claims. The invention is not intended to be limited by the foregoing disclosure but, within the scope of the appended claims, may be practiced otherwise than as specifically described herein.

The invention claimed is:

1. A collapsible and expandable support device capable of attaining collapsed and expanded configurations, comprising:

first and second sheet means having interior and exterior surfaces and fold lines for permitting said first and second sheet means to attain collapsed and expanded configurations;

a collapsible and expandable core being collapsible to a collapsed configuration and expandable to an expanded configuration; having end portions thereof fixedly secured to oppositely disposed portions of said interior surfaces of said first and second sheet means at positions intermediate said fold lines; and having oppositely disposed side portions; and means disposed upon at least one of said interior surfaces of one of said first and second sheet means for releasably engaging at least one of said side portions of said collapsible and expandable core when said collapsible and expandable core is disposed in said expanded configuration so as to maintain said collapsible and expandable support device in said expanded configuration, and for permitting disengagement from said at least one of said side portions of said collapsible and expandable core so as to permit said collapsible and expandable core and said collapsible and expandable support device to attain said collapsed configurations.

2. A device as defined in claim 1, wherein:
said releasably engaging means comprises tape means which includes at least one piece of tape adhered to said at least one of said interior surfaces of one of said first and second sheet means.

3. A device as defined in claim 2, wherein at least one piece of tape is connected to the inner side of each sheet.

4. A device as defined in claim 2, wherein:
said at least one piece of tape is adhered to said at least one of said interior surfaces of one of said first and second sheet means at a position which is adjacent to said fold line of said at least one of said first and second sheet means.

5. A device as defined in claim 4, further comprising:
at least one release liner secured to at least one of said interior surfaces of one of said first and second sheet means at a predetermined location for contacting said at least one piece of tape when said device is disposed in said collapsed configuration and for releasing said at least one piece of tape so as to permit said device to move to said expanded configuration.

6. A device as defined in claim 2, wherein:
a piece of tape is adhered to an interior surface of each one of said first and second sheet means at a position which is adjacent to each one of said fold lines of said first and second sheet means.

7. A device as defined in claim 6, wherein:
a release liner is secured to each one of said interior surfaces of each one of said first and second sheet means at predetermined locations for contacting said tape adhered to said interior surface of each one of said first and second sheet means when said device is disposed in said collapsed configuration and for releasing said tape adhered to said interior surface of each one of said first and second sheet means so as to permit said device to move to said expanded configuration.

8. A device as defined in claim 2, wherein said means is a pressure-sensitive tape.

9. A device as defined in claim 1, wherein said core is an open-celled construction.

10. The device as set forth in claim 1, wherein:
said device comprises a roll riser for staggering paper rolls during shipment.

11. The device as set forth in claim 1, wherein:
said first and second sheet means comprise corrugated cardboard.

12. The device as set forth in claim 1, wherein:
said fold lines comprise integrally formed score indentations.

13. A collapsible and expandable support device capable of attaining collapsed and expanded configurations, comprising:
first and second sheet means having interior and exterior surfaces, and fold lines, defining foldable sections of said first and second sheet means, for permitting said first and second sheet means to attain collapsed and expanded configurations;
a collapsible and expandable core being collapsible to a collapsed configuration and expandable to an expanded configuration; having end portions thereof fixedly secured to oppositely disposed portions of said interior surfaces of said first and second sheet means at positions intermediate said fold lines; and having oppositely disposed side portions; and
means disposed upon a first portion of at least one of said exterior surfaces of one of said foldable sections of one of said first and second sheet means for releasably engaging a first portion of at least one of said exterior surfaces of one of said foldable sections of a second one of said first and second sheet means when said collapsible and expandable core is disposed in said expanded configuration so as to maintain said collapsible and expandable support device in said expanded configuration, and for permitting disengagement from said first portion of said at least one of said exterior surfaces of one of said foldable sections of said second one of said first and second sheet means so as to permit said collapsible and expandable core and said collapsible and expandable device to attain said collapsed configurations.

14. A device as defined in claim 13, wherein: has an inner side and an outer side;
said releasably engaging means comprises tape means which includes at least one piece of tape secured to said first portion of said exterior surface of one of said foldable sections of said first sheet means and extending from one side portion of said collapsible and expandable core to another side portion of said collapsible and expandable core so as to be secured to said first portion of said exterior surface of one of said foldable sections of said second sheet means when said device is disposed in said expanded configuration.

15. A device as defined in claim 14, wherein:
said tape is secured to said first portion of said exterior surface of one of said foldable sections of said first sheet means at a position which is adjacent to said fold line of said first sheet means, and is secured to said first portion of said exterior surface of one of said foldable sections of said second sheet means at a position which is adjacent to said fold line of said second sheet means when said device is disposed in said expanded configuration.

16. The device as set forth in claim 14, wherein:
said at least one piece of tape is secured to a second portion of said exterior surface of a second one of said foldable sections of said first sheet means so as to releasably interconnect said first and second foldable sections of said first sheet means and thereby retain said support device in said collapsed configuration.

17. A device as defined in claim 16, further comprising:
a release liner secured to said second portion of said exterior surface of said second one of said foldable sections of said first sheet means at a predetermined location so as to permit said at least one piece of tape to be adhered to said liner when said support device is disposed in said collapsed configuration, and to permit said at least one piece of tape to be removed from said liner and be secured to said first portion of said exterior surface of said one of said foldable sections of said second sheet means when said device is disposed in said expanded configuration.

18. A device as defined in claim 16, further comprising:
a release liner secured to said first portion of said exterior surface of said one of said foldable sections of said second sheet means at a predetermined location for engaging said at least one piece of tape when said device is disposed in said expanded configuration, and for releasing said at least one piece of tape so as to permit said device to attain said expanded configuration.

19. The device as set forth in claim 14, wherein: said tape comprises pressure-sensitive tape.

20. The device as set forth in claim 13, wherein:
said core comprises an open-celled construction.

21. The device as set forth in claim 13, wherein:
said device comprises a roll riser for staggering paper rolls during shipment.

22. The device as set forth in claim 13, wherein:
said first and second sheet means comprise corrugated cardboard.

23. The device as set forth in claim 13, wherein:
said fold lines comprise integrally formed score indentations.

* * * * *